United States Patent [19]

Nishida et al.

[11] Patent Number: 5,311,537

[45] Date of Patent: May 10, 1994

[54] ION LASER TUBE

[75] Inventors: Kazuhisa Nishida; Takashi Kanamoto, both of Tokyo, Japan

[73] Assignee: NEC Corporation, Japan

[21] Appl. No.: 984,352

[22] Filed: Dec. 2, 1992

[30] Foreign Application Priority Data

Mar. 19, 1992 [JP] Japan .................. 4-062907

[51] Int. Cl.⁵ .............................. H01S 3/03
[52] U.S. Cl. ...................... 372/61; 372/65; 372/34
[58] Field of Search .............. 372/61, 62, 64, 55, 372/87, 65

[56] References Cited

U.S. PATENT DOCUMENTS 4,750,186  6/1988  Steffen .................. 372/65
4,912,719  3/1990  Kanamoto et al. .......... 372/61

Primary Examiner—Léon Scott, Jr.
Attorney, Agent, or Firm—Laff, Whitesel, Conte & Saret

[57] ABSTRACT

The object of the present invention is to prevent generation of leak caused by deterioration of a frit glass component at AlN/KB glass sealing section which is caused by discharge at the time of laser tube operation.

In the present invention, a high fusing point glass made up of a zinc/boric acids material is used at the sealing section of AlN/KB glass, adding to use a conventional low fusing point glass made up of a lead/sillic acids material. By means of this, it is possible to reduce the number of bubbles generation on the sealing interface of an AlN component and a low fusing point glass and to prevent deterioration of the low fusing point glass at laser tube operation and leak at the sealing section.

5 Claims, 2 Drawing Sheets

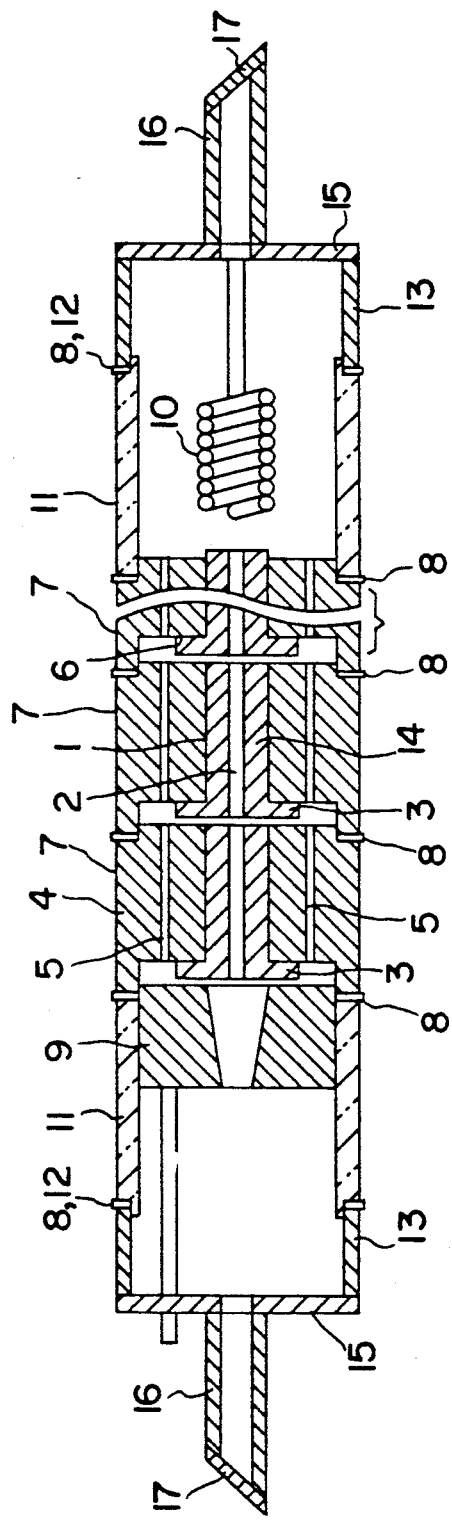
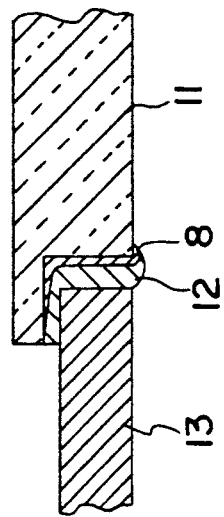
FIG.1
FIG.2

ION LASER TUBE

FIELD OF THE INVENTION

The present invention relates to an ion laser tube, especially a construction of a section of a discharge capillary of an ion laser tube enabling a high laser output by a discharge of a large electric current.

BACKGROUND OF THE INVENTION

Conventionally, in an ion laser performing a laser oscillation by an energy transition owing to ionization of a gaseous active medium such as argon or krypton, it is necessary to increase ion density along with increasing an output level. In this case, a large electric current over 30 A may be charged. Therefore, for a discharge capillary and an envelope a material having a high thermal conductivity to effectively reject heat generated by a large electric current in the discharge section of the capillary and durable to high ion density plasma was needed.

Recently, silicon carbide(SiC) and aluminium nitride (AlN) as a material meeting such conditions are used. That is, in this case, SiC is used for a plasma capillary material and AlN is used for an envelope material. Also, AlN components are air-tightly sealed each other with frit glass for forming a laser tube.

A longitudinal section of a conventional ion laser tube is shown in FIG. 3. The bore material 1 made up of SiC having a capillary tube hole 2 in the center and the flange 3 is inserted to the envelope 4 made up of AlN and sealed by the high fusing point glass 6, thus the capillary composite component 7 is formed. Next, a plurality of capillary composite components 7 are coaxially and air-tightly sealed each other by an appropriate jig (not shown in the figure) and the high fusing point glass 8 made up of a zinc/boric acids material. Then, the hollow pipe 11 made up of AlN is sealed for including the anode 9 and cathode 10. The tubular components made up of boro-silicate glass 13 (hereinafter referred to as a KB glass component) are air-tightly sealed at the both sides of the hollow pipes with the low fusing point glass 12 made up of a lead/sillic acids material, thus the discharge capillary path 14 is formed. FIG. 4 is an enlarged cross section of the sealing section of the conventional hollow pipe 11 made up of AlN and the KB glass component 13. The hollow pipe 11 made up of AlN and the KB glass component 13 are sealed only with the low fusing point glass 12 made up of a lead/sillic acids material. Like this, in the conventional ion laser tube the low fusing point glass 12 made up of a lead/sillic acids material of which sealing temperature is low is used for sealing, because the distortion point of the KB glass component 13 having the similar coefficient of thermal expansion to AlN is low such as 500° C. and it is impossible to seal with the high fusing point glass 8 made up of a zinc/boric acids material.

More, the end plates 15 respectively having the anode 9 and the cathode 10 are connected to the respective end portions of the discharge capillary path 14, the respective glass valves 16 are connected to end portions of the end plates 15, further the Brewster windows 17 are connected to the end portions of glass valves 16. After that, argon gas of the pre-determined quantity is sealed. Thus, the ion laser tube is completed.

However, in the above-mentioned conventional ion laser tube, there is a problem that the low fusing point glass made up of a lead/sillic acids material used in the ion laser tube is low in heat resistance and the lead(lead oxide) component included in the low fusing point glass made up of a lead/sillic acids material reacts with aluminium (Al) in the AlN surface and nitrogen ($N_2$) is generated on the sealing interface at the time of sealing of the hollow pipe 11 made up of AlN and the KB glass component 13. As the result, a defect such as many bubbles are generated on the sealing interface occurs and air-tightness at the sealing section is failed. Conventionally, a bubble occupation area ratio to the sealing area is over 50%.

SUMMARY OF THE INVENTION

The object of the present invention is to offer an ion laser tube that is excellent in air-tightness at sealing sections, so that highly reliable.

The object of the present invention is achieved by an ion laser tube comprising:

a capillary tube hole means for a discharge path in the center of the ion laser tube:

a capillary composite component means consisting of a plurality of bore materials coaxially connected each other, wherein each bore material having a flange section is inserted and sealed to an envelope made up of Aluminum Nitride;

hollow pipe means made up of aluminium nitride respectively connected to both end portions of the capillary composite component;

discharge capillary path means comprised by tubular components made up of boro/silicate glass respectively connected to the both end portions of the hollow pipe means;

a metallic end plate means having an anode, connecting to one end portion of the discharge capillary path means;

a metallic end plate means having a cathode, connecting to another end portion of the discharge capillary path means;

glass valve means respectively having a Brewster window, respectively connecting to the metallic end plate means;

wherein the sealing planes of the hollow pipe means made up of aluminium nitride are covered with a homogeneous glass having a high fusing point and respectively sealing the tubular components made up of boro/silicate glass via glass having a low fusing point in the sealing sections of the hollow pipe means made up of aluminium nitride and the tubular component made up of boro-silicate glass.

More, in the present invention, it is preferable that for the high fusing point glass the glass transition point thereof is in 550° to 600° C., the softening point thereof is in 620° to 670° C., and for the low fusing point glass the glass transition point thereof is in 300° to 350° C., the softening point thereof is in 400° to 450° C. Also the sealing work is performed in around 700° to 750° C. for the high fusing point glass and around 400° to 500° C. for the low fusing point glass.

For a high fusing point glass having the above-mentioned characteristics, a glass including $ZnO/B_2O_3$ group in crystallizability as a principal component can be listed up. For a low fusing point glass having the above-mentioned characteristics, a glass including $PbO/SiO_2$ group in non-crystallizability as a principal component can be listed up.

Further, a so-called homogeneous glass of which percentage content of filler is 2% by weight or less is preferable for the high fusing point glass. Contrary to this, the percentage content of filler of the low fusing point glass can be larger such as 20 to 25% by weight. Hereupon, the filler is a material to be added in a principal glass component to adjust its characteristics such as coefficient of thermal expansion or sealing temperature to desirable characteristics, for example $LiO_2$ or the like is used.

Further more, using the above-mentioned glass for sealing of a hollow pipe made up of aluminium nitride and a tubular boro/sillicate glass component, a sealing result that realizes few bubble generation and high airtightness at sealing section can be obtained, because the glass hardly reacts with aluminium nitride. As the result, a highly reliable ion laser tube can be obtained.

The high fusing point glass made up of a zinc/boric acids material is of crystallizability, the sealing temperature is 700° C. or more. On the other hand, the low fusing point glass made of a lead/sillic acids material is of non-crystallizability, the sealing temperature is 700° C. or less.

Described as above, using a homogeneous high fusing point glass made up of a zinc/boric acids material of which sealing temperature is high and sealing strength is large and reactivity with AlN is weak, the present invention realizes to reduce the number of the bubbles generating on the sealing surface to less than 1/10 of the conventional ion laser tube.

DESCRIPTION OF THE FIGURES AND CODES

FIG. 1 is a longitudinal section showing an embodiment of the ion laser tube by the present invention.

FIG. 2 is an enlarged cross section of the sealing section of the hollow pipe made up of AlN and the KB glass component by the present invention.

DESCRIPTION OF THE CODES

Figure 3:
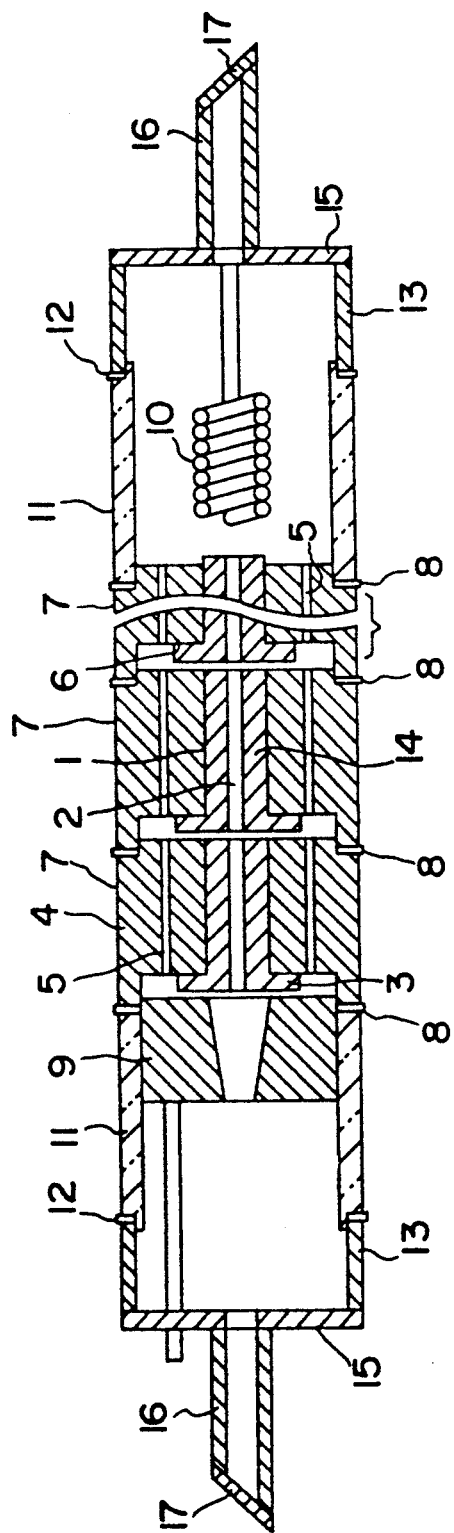
FIG. 3 is a longitudinal section of a conventional ion laser tube.
Figure 4:
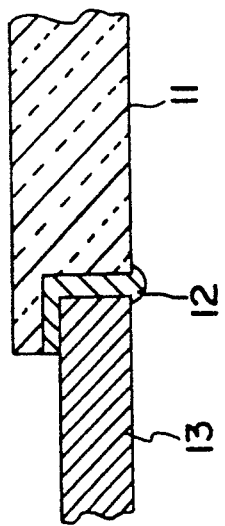
FIG. 4 is an enlarged cross section of the sealing section of the hollow pipe made up of AlN and the KB glass component of the conventional ion laser tube.

1 Bore Material
2 Central Capillary Tube Hole
3 Flange
4 Envelope made up of AlN
5 Gas Return Hole
6 High Fusing Point Glass
7 Capillary Composite Component
8 Zinc/Boric Acids High Fusing Point Glass
9 Anode
10 Cathode
11 Hollow Pipe made up of AlN
12 Lead/Sillic Acids Low Fusing Point Glass
13 KB Glass Component
14 Discharge Capillary Path
15 Anode
16 Glass Valve
17 Brewster window

DESCRIPTION OF EMBODIMENTS OF THE INVENTION

Next, the present invention is described referring to the figures. FIG. 1 is a longitudinal section of the ion laser tube showing an embodiment of the present invention, FIG. 2 is an enlarged cross section of the sealing section of the hollow pipe made up of AlN and the KB glass component.

At first, the cylindrical bore material 1 having a central capillary tube hole 2 and the flange 3 is inserted to the envelope 4 made up of AlN having the gas return hole 5, and sealed with the high fusing point glass 6, thus the capillary composite component 7 is formed. A plurality of the capillary composite components 7 are coaxially and air-tightly sealed each other using high fusing point glass 8 made up of a zinc/boric acids material as many as to be an enough capillary length (500 to 600 mm) enabling to obtain a desired laser output. Then, the hollow pipes 11 made up of AlN to include the anode 9 and cathode 10 are connected. After that, the KB glass components 13 are air-tightly sealed on the end portions of the respective hollow pipes 11 made up of AlN using the high fusing point glass 8 made up of a zinc/boric acids material and the low fusing point glass 12 made up of a lead/sillic acids material, thus the discharge capillary path 14 is formed.

Silicon Carbide (SiC) or beryllium oxide (BeO) that is excellent in discharge proof (plasma proof) is used for the bore material 1. For example, PF-7574 made by Iwaki Glass Ltd. of which coefficient of thermal expansion is similar to AlN such as 37 to $50 \times 10^{-7}$/° C., the sealing temperature is 730° C. and the sealing strength is 1100 kg/cm$^2$ is used for the high fusing point glass 8 made up of a zinc/boric acids material. Also LS-0111M made by Nihon Electric Glass Ltd. of which coefficient of thermal expansion is in 45 to $50 \times 10^{-7}$/° C., the sealing temperature is 460° C. and the sealing strength is 400 kg/cm$^2$ is used for the low fusing point glass 12 made up of a zinc/sillic acids material. The sealing of the hollow pipe 11 and the KB glass component 13 was performed in such a manner that a paste of the high fusing point glass 8 made up of AlN was painted with a brush and temporary burned in advance on the sealing surface of the hollow pipe 11 made up of AlN, after that low fusing point glass 12 made up of a lead/sillic acids material was used.

More, the end plates 15 respectively having the anode 9 and the cathode 10, and the glass valves 16 are respectively connected to the end portions of the discharge capillary path 14, then the Brewster windows 17 made up of optical quartz are connected to the tips of glass valves 16. After that, argon gas of the predetermined quantity is sealed. Thus, the ion laser tube is completed.

Next, the second embodiment of the present invention is described. The second embodiment is characterized to use a disc-like tablet as the high fusing point glass 8 for providing the high fusing point glass 8 made up of a zinc/boric acids material on the sealing surface of the hollow pipe 11 made up of AlN. A tablet-like high fusing point glass 8 was put on the hollow pipe 11 made up of AlN, and burned as it was. Then, it was sealed with KB glass component 13 using the low fusing point glass 12 made up of a lead/sillic acids material.

At the sealing section between the hollow pipe and the KB glass component formed as above, the bubble occupation area ratio to sealing area was in 2 to 3%, that is, it is extremely small in comparison with the conventional value, 50%. As the result, the leak generation at operating lasers became nothing.

What is claimed is:
1. An ion laser tube comprising:
a plurality of capillary tubes, each of said capillary tubes having a flange and a through hole for an electric discharge;

a plurality of tubular members made of AlN;

a plurality of capillary composite components, each of said capillary composite components comprising one of said capillary tubes and said tubular members;

an electric discharge section including said capillary composite components arranged along an axis of the ion laser tube, hollow pipes having opposite ends made of AlN and hollow pipes having opposite ends made of borosilicate glass;

sealing sections connecting said hollow pipe made of AlN and said hollow pipe made of borosilicate glass, wherein each of said sealing sections of said hollow pipe made of AlN is a high fusing point glass and a low fusing point glass applied thereon to seal said hollow pipe made of AlN and said hollow pipe made up of borosilicate glass;

a metallic end plate means having an anode, connected to one end of said electric discharge section;

another metallic end plate having a cathode, connecting to another end of said electric discharge section; and glass valves, wherein each of said glass valves has a Brewster window, each of said glass valve being connected to each end of said metallic end plate.

2. An ion laser tube as set forth in claim 1, wherein a glass transition temperature of said high fusing point glass is in an approximate range of 550° to 600° C., and a softening temperature thereof is in an approximate range of 620° to 670° C. and a glass transition temperature of said low fusing point glass is in an approximate range of 300° to 350° C., and a softening temperature thereof is in an approximate range of 400° to 450° C.

3. An ion laser tube as set forth in claim 1, wherein a percentage content of filler for controlling a thermal expansion coefficient of said high fusing point glass is not more than about 2% by weight; and a percentage content of filler for controlling a thermal expansion coefficient of said low fusing point glass is in an approximate range from 20 to 25% by weight.

4. An ion laser tube as set forth in claim 1, wherein said high fusing point glass has a crystallizability and comprises $ZnO/B_2O_3$.

5. An ion laser tube as set forth in claim 1, wherein said low fusing point glass is amorphous and comprises $PbO/SiO_2$.

* * * * *